United States Patent [19]

Guerguerian

[11] 4,139,244
[45] Feb. 13, 1979

[54] JOURNAL BEARING FILM CONTROL SYSTEM

[75] Inventor: Rhual L. Guerguerian, Lasalle, Canada

[73] Assignee: Dominion Engineering Works Limited, Lachine, Canada

[21] Appl. No.: 802,352

[22] Filed: Jun. 2, 1977

[30] Foreign Application Priority Data

Oct. 13, 1976 [CA] Canada ................................. 263263

[51] Int. Cl.² ........................ F16C 13/04; F16C 35/02
[52] U.S. Cl. ........................................ 308/9; 241/36; 308/122
[58] Field of Search ................ 308/9, DIG. 1, 22, 15, 308/29, 122, 121, 1 A, 73, 72, 4 R, DIG. 14, 240, 3 A, 237, DIG. 4, 5 R, 160, 127, 126, 32, DIG. 15; 241/34, 36

[56] References Cited

U.S. PATENT DOCUMENTS

| 2,760,832 | 8/1956 | Bidwell ............................ 308/122 X |
| 3,350,018 | 10/1967 | Harris et al. .................... 308/122 X |
| 3,717,392 | 2/1973 | Ennis .................................... 308/9 X |

Primary Examiner—Trygve M. Blix
Assistant Examiner—Douglas C. Butler
Attorney, Agent, or Firm—R. A. Eckersley

[57] ABSTRACT

The bearings for a rolling mill capable of carrying very large ore loads for grinding reduction therein are provided with an arrangement of a plurality of magnetic flux proximitors mounted in the bearing pads, to provide a readout of oil film thickness between the pads and the journal surface supported thereby. The arrangement permits achieving accurate alignment of the mill bearings in operation, and the control of operating conditions by maintaining the load bearing capacity within pre-set acceptable limits for the respective bearing.

11 Claims, 12 Drawing Figures

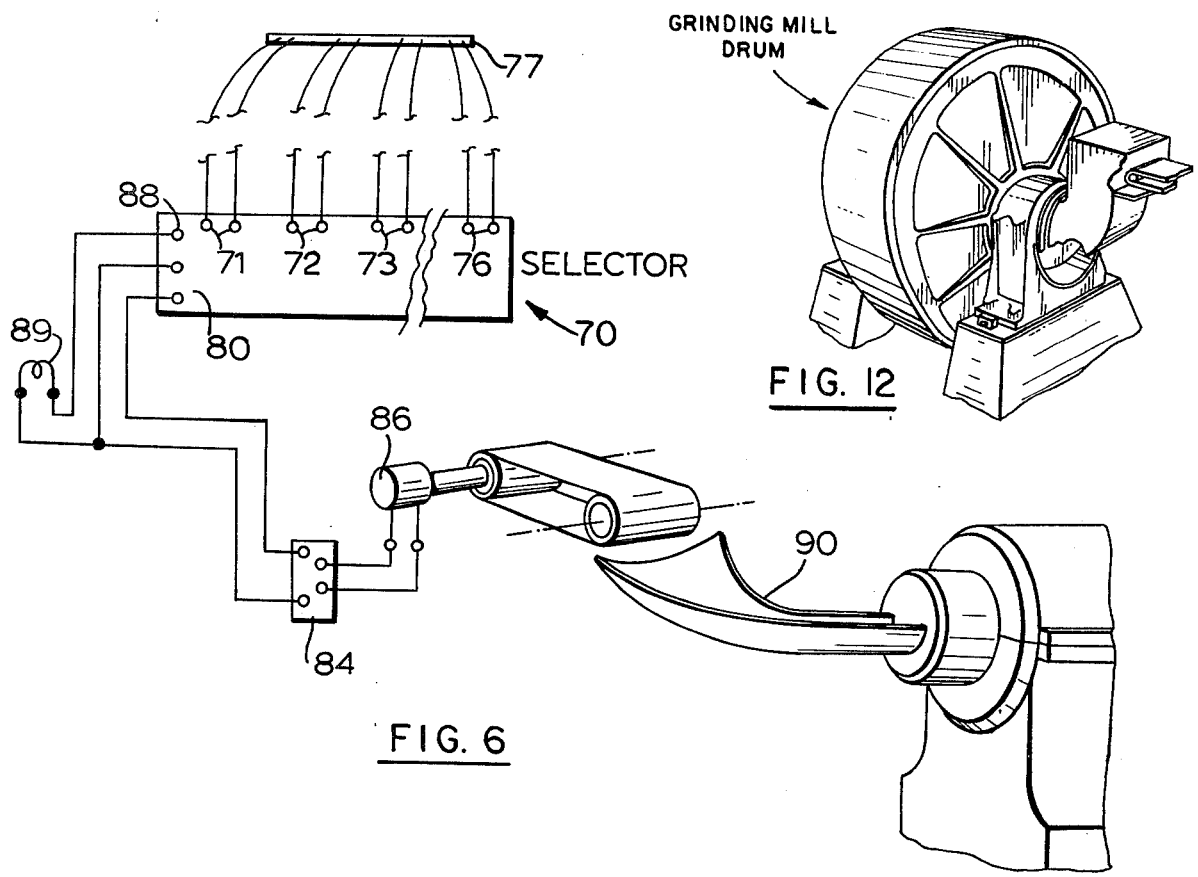
FIG. 6
FIG. 12
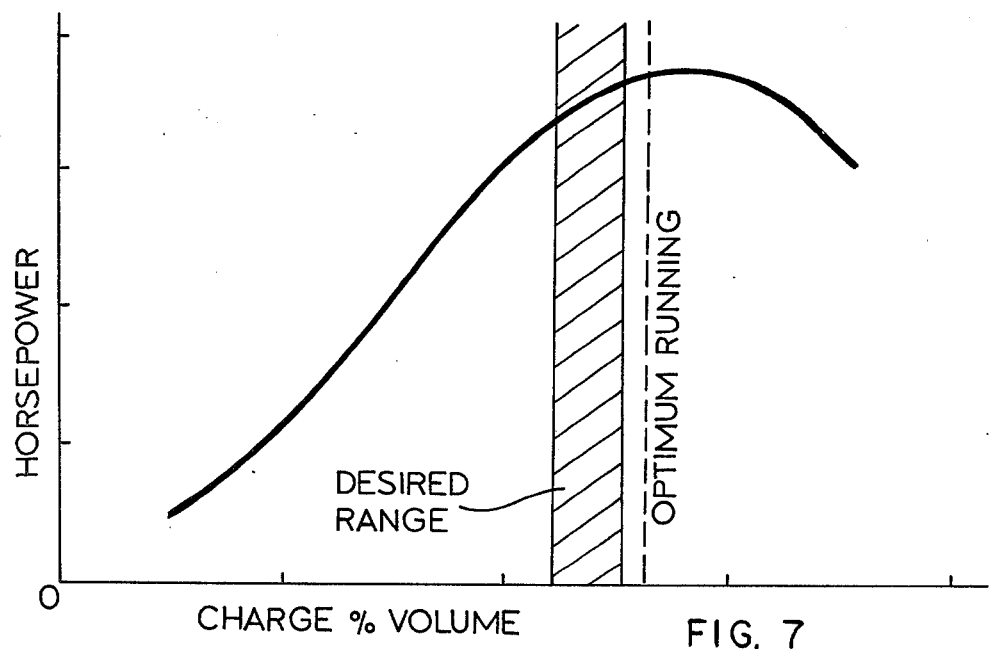
FIG. 7
PRIOR ART

JOURNAL BEARING FILM CONTROL SYSTEM

This invention is directed to improved bearings of the journal type and in particular to the provision of an improved bearing suitable for use with significantly deformable journals, and to a method of aligning bearings in operation.

The operation of processing machinery tends to the use of ever increasing sizes of machine, on grounds of increased efficiency.

In machines that are subject to very heavy loads, particularly very large grinding machines utilizing hollow support trunnions and also those utilizing multiple bearing pads operating against annular tires or bands mounted on the drum, many problems arise with the bearings. These latter type of tire bearings are also considered as journal bearings, for the purpose of the present application.

Owing to the size of the components, the heavy loadings and the manner in which the loads vary during operation, it has been most difficult to provide that reliability of components and flexibility of load control to complement the gain in efficiency of the plant achieved by scaling up in size.

The increase in the size of mills and changes in design philosophy have lead to interrelationships between elements of the mill structure such that bearing lubrication provisions that were formerly acceptable no longer can reliably maintain the mill in satisfactory operating condition. Previous attempts have been made in the case of smaller mills to monitor the conditions prevailing in the bearings of a mill, with a view to optimizing mill loading in response to the achievement of a predetermined value of hydrodynamic pressure of the lubricant film, as shown in U.S. Pat. No. 3,350,018, T. E. Harris et al, Oct. 31, 1967, assigned to the assignee of the present invention.

The degree of success previously achieved has been limited, and the advent of significantly larger mills operating with greater structural deflections and having more complex support arrangements for the drum such as multiple pad bearings has made certain previous bearing lubrication arrangements quite un-acceptable.

A further, previously unrecognized problem associated with earlier arrangements for reading bearing film dynamic pressure is that the film pressure characteristic, plotted in the axial direction, can be markedly peaky, so that one or two spot points do not give a true indication of overall bearing conditions or performance.

A further problem is that of setting up or aligning the bearings during the mill erection phase; and of maintaining the alignment during operation. The increase in size of mill structures, the relatively greater flexibility of the structures, and the increased difficulty in handling the component parts militate against the usual practice of aligning and fitting the bearings by use of gauging and/or marking, such as the use of leads and the application of bluing material. Furthermore, these former methods may not be performed in operation, and also do not lend themselves to fitting the bearings to a mill when loaded (i.e. in a truly operational condition).

The present arrangement provides a radical departure from prior mill practice, in that the bearing oil film clearance in the radial direction is monitored during operation, to ensure that requisite oil film thicknesses are maintained and that the bearing effective area of contact surface also is sustained. In providing a mill structure having a plurality of supporting bearing surfaces, wherein are implanted below each such surface a plurality of proximity sensors to sense the value of respective oil film thickness extending between a point on the bearing surface and the adjacent supported journal surface, it is possible to obtain a continuous read-out indicative of bearing condition. In effect it is thus possible to monitor both the relative position and the relative deformation of the related components.

There is also provided a method of aligning the bearings of a mill with the journals thereof, in a mill having a bearing structure incorporating a plurality of sensors of oil lubrication film thickness, the method being susceptible of use with the mill in an operating condition, including the steps of assembling the mill components, providing a lubricating oil film in the bearings, sensing the thickness of the oil film at respective positions of the bearings, and adjusting the alignment of the bearing in relation to the mill journal to enhance the characteristics of the oil film.

It will be understood that the oil film will normally be provided under initial standstill conditions by the use of a jacking oil pump, while under running conditions the normal lubricating pump will be used.

It has been found that it is necessary, for the effective maintenance of the lubricating oil film, not to permit the radial bearing clearance to fall below a nominal value (usually about 0.003 inches). The location of minimum film thickness and the point at which it occurs is most difficult to forecast, due to actual motion of the drum under variations of internal loading and the continual shifting of the load within the drum as the drum slowly rotates. Added to this, the flexure or deformation of the drum components can also vary with variations in the drum charge or contents, as also can vary the profile of the supporting bearing surface and its associated flexible supporting structure. Thus in the case of a trunnion supported mill the trunnions flex as they rotate, to an out-of-round condition, and in the case of mill drums supported on peripheral tires extending around the drum, these tires also flex into non-circular profiles.

Prior use of magnetic proximity sensors is known in arrangements of high speed rotary machines such as steam turbines wherein the relative position of the rotor with regard to non-moving portions of the turbine structure is determined generally using one or two proximity sensors arranged in air-spaced relation from a conducting component of the machine rotor, generally utilizing a radial air gap in the order of 0.015 inches between the sensor and the rotor component. With use of two such sensors in mutual quadrature relation to provide a vertical component of gap variation and a horizontal component of gap variation respectively, the true position of the rotor in relation to the fixed structure may thus be determined. Use of such an arrangement has also been made for vibration analysis of critical modes.

Such prior use has not contemplated the occurrence of reactive forces such as in an oil film and the generation of relative deformations between stationary and rotary components of the system, as disclosed in the present disclosure.

Also prior arrangements have not utilized a co-ordinated arrangement of proximity sensors to ensure maintenance of minimum oil film thickness, nor to monitor maximum bearing clearances so as to maintain a sufficiency of oil film support area in relation to the total load being supported.

Further problems for which the present invention provides some amelioration comprise the inability to obtain access during operation of the mill to the clearances between the two surfaces bounding the oil film that are remote from the bearing edge, and the inability to set up and/or adjust the relative position of the bearing while the mill operates.

The present arrangement provides a bearing, for use with a large diameter nominally cylindrical deformable support means such as a hollow support trunnion or a peripheral annular tire secured to a rotatable load bearing drum in partial supporting relation therewith, comprising bearing liner means subtending substantially an arc of a circle, bearing support means in deformable supporting relation beneath the liner means to provide support to an undersurface of the liner means in load transfer relation therewith, a bearing upper surface of the liner means having a contiguous surface to provide support to the cylindrical support means, lubrication supply means to provide fluid lubricant to the liner upper surface, a plurality of recesses in the liner means in mutually spaced relation each extending closely adjacent the cylindrical surface, and sensing probe means located within the recesses each having a head portion thereof in predetermined spaced and oriented relation from the cylindrical surface to provide in use, when energized an effective magnetic flux linkage with said deformable support, and a readout signal responsive to variations in spacing relation between the probes and the deformable support means.

The subject bearing arrangement is of considerable value for verifying bearing performance, in view of the general use of empirical design methods generally employed in designing this type of structure and bearing. In addition to validating bearing design an indication of the adequacy of trunnion or support-tire design also is obtained.

An additional advantage of the subject arrangement, wherein the actual film thickness of the oil lubricant is determined, is the function of checking the performance of the lubricating oil pump or pumps. It will be evident that one very significant factor which affects the overall thickness of the oil film is the factor of lubricating oil pump performance. The pump oil output at the bearing flows along a semi-annular flow path which comprises the oil film. As the lubricating oil pump wears, so the through-put is diminished, and the flow path cross-sectional area, as represented by film thickness, consequently contracts. Thus the recording of a change in film thickness by a uniform diminution of the thickness of the film predominantly at the bottom of the bearing would primarily be an indication of change in lubricating oil pump performance. The temperature and the viscosity of the oil are additional factors to be considered, in evaluating the results of a film thickness test in relation to pump performance.

It is contemplated that the plural readouts available from a suitably instrumented bearing may be utilized by programming acceptable performance limits for the subject bearing. Thus, with the provision of several proximity sensors located for each bearing to provide indication of oil film thickness at the most likely critical areas, by maintaining the oil film thickness within predetermined values, the maintenance of at least a minimum film thickness will assure correct lubrication to avoid bearing failure and the avoidance of an excessive clearance, to maintain desired lubricant film relationships will ensure the maintenance of lubricant pressure with consequent load transfer capability over the related bearing area.

It is further contemplated that the respective outputs of a plurality of proximity sensors may be appropriately utilized in controlling alignment, with bearing servo means, to correct the relative alignment of the bearing means with the respective journal surface.

Certain embodiments of the invention are described, reference being made to the accompanying drawings, wherein;

FIG. 6 is a diagramatic control circuit for a mill feed in accordance with the presently disclosed system;

FIG. 7 is a mill operational characteristic curve;

FIGS. 11 and 12 show mills of the tire supported type and the trunnion supported type, respectively.

Figure 1:
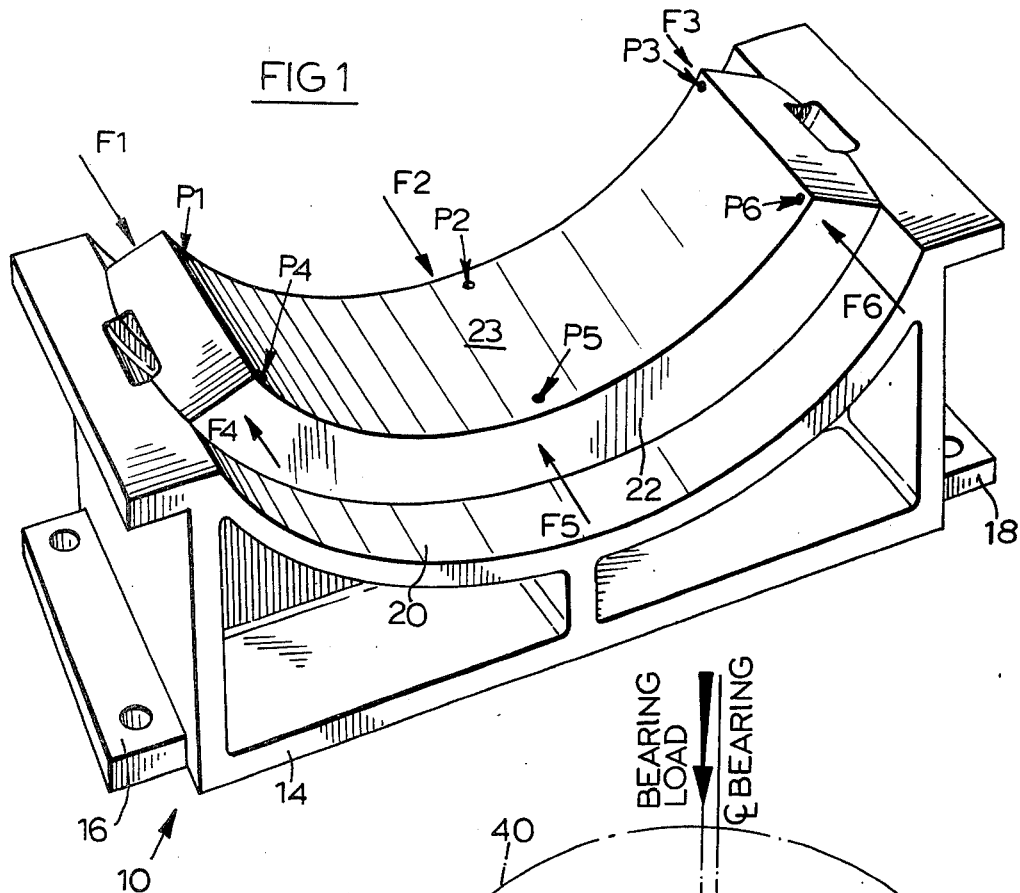
FIG. 1 is a diagramatic general view of a cylindrical bearing with a spherical seat and adjustable support structure incorporating an array of proximity sensors.

FIG. 1 is somewhat schematic, partly with a view to conveying an impression of the relative proportions of the components involved, in that the bearing arc illustrated might well be of 6 feet radius or more. The bearing arrangement 10 comprises a support cradle 14 suitable for mounting on a pedestal (not shown), with flanges 16, 18 for attachment thereby. The arcuate portion 20 of the cradle is of spherical shape, to permit the accommodation of the bearing pad 22 by adjustment to any tilting of the axis of the trunnion (not shown). The pad 22 has a substantially cylindrical surface 23 to receive the trunnion in supported relation thereon. A series of probe locations P1, P2 . . . P6 are shown as probable locations for an appropriate number of proximity sensors. Commercially available probes to carry out this function are eddy current proximitors by the companies Bentley Nevada of Minden, Novada, Eldec Corporation of Lynnwood, Washington, and Dymac Corporation (Spectral Dynamics Corp.) of San Diego, Calif., among other.

A series of six arrows F1–F6 indicate the location and line of action of jacking points by means of which the pad 22 can be adjusted on its spherical seat portion 20 in any desired mode, in order to correct the alignment of bearing pad 22 with the journal (not shown).

Figure 2:
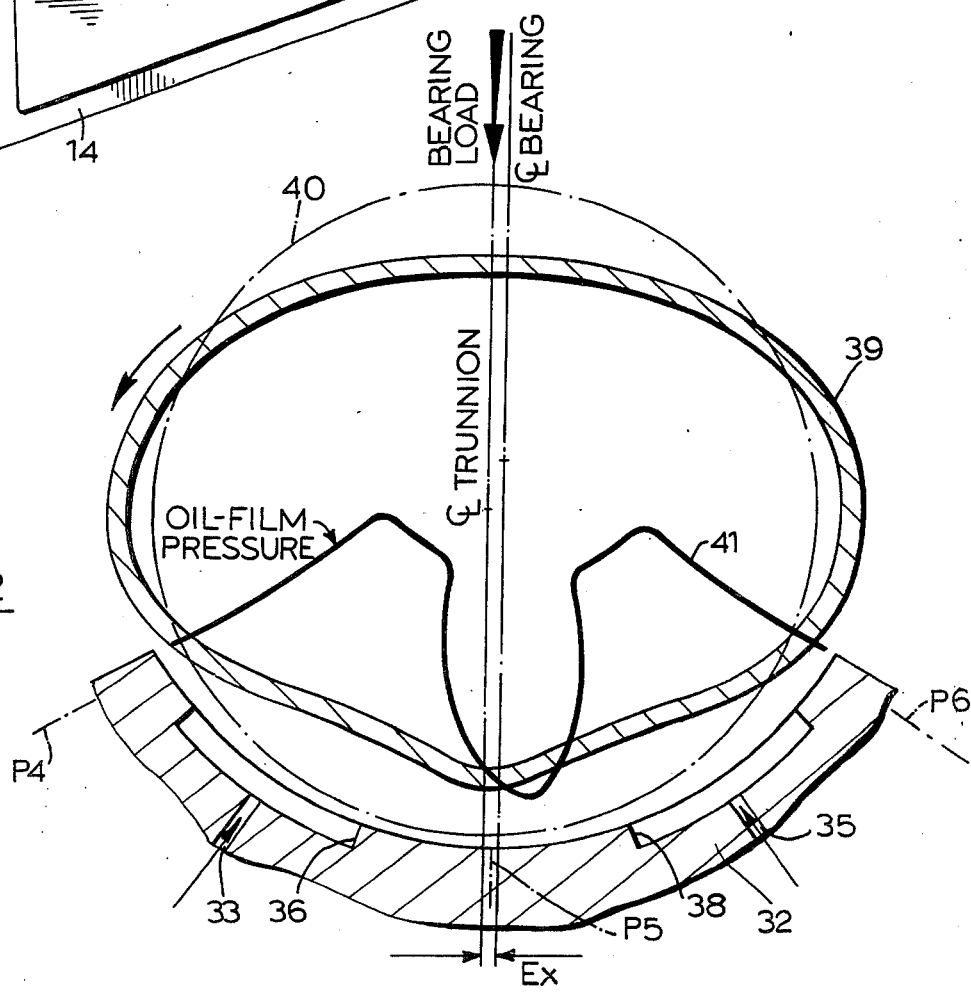
FIG. 2 is a diagramatic cross section of a trunnion and its bearing to indicate typical deformations in exaggerated form.

Referring to FIG. 2, a bearing pad 32 having oil flow access ways 33, 35 connecting with oil pockets 36, 38 is shown supporting a trunnion 39, the deformation of which is grossly exaggerated from the theoretical undeformed arc 40.

A probable pattern of variation of oil film pressure is illustrated in relation to this particular arrangement by the curve 41. The relative locations of three probes P4, P5 and P6 are shown. It will be seen that the trunnion centre occupies an instantaneous value having both vertical and horizontal eccentricity from the centre of the bearing pad 32. The horizontal or transverse eccentricity tends to diminish the oil film thickness at the location P4, referred to as the leading edge of the bearing, and to increase the clearance at the trailing edge, at location P6.

The location of the trunnion centre, which is in any case a theoretical concept, is referred to as having an instantaneous value because the load system in a mill is dynamic tumbling and not static, and factors such as bearing load will change with variation in drum charge, both in regard to quantity and quality. Thus the gross load can vary, affecting the load on each trunnion, while load distribution between the trunnions can be affected by the quality of the load, as it affects the load gradient in the mill.

Figure 3:
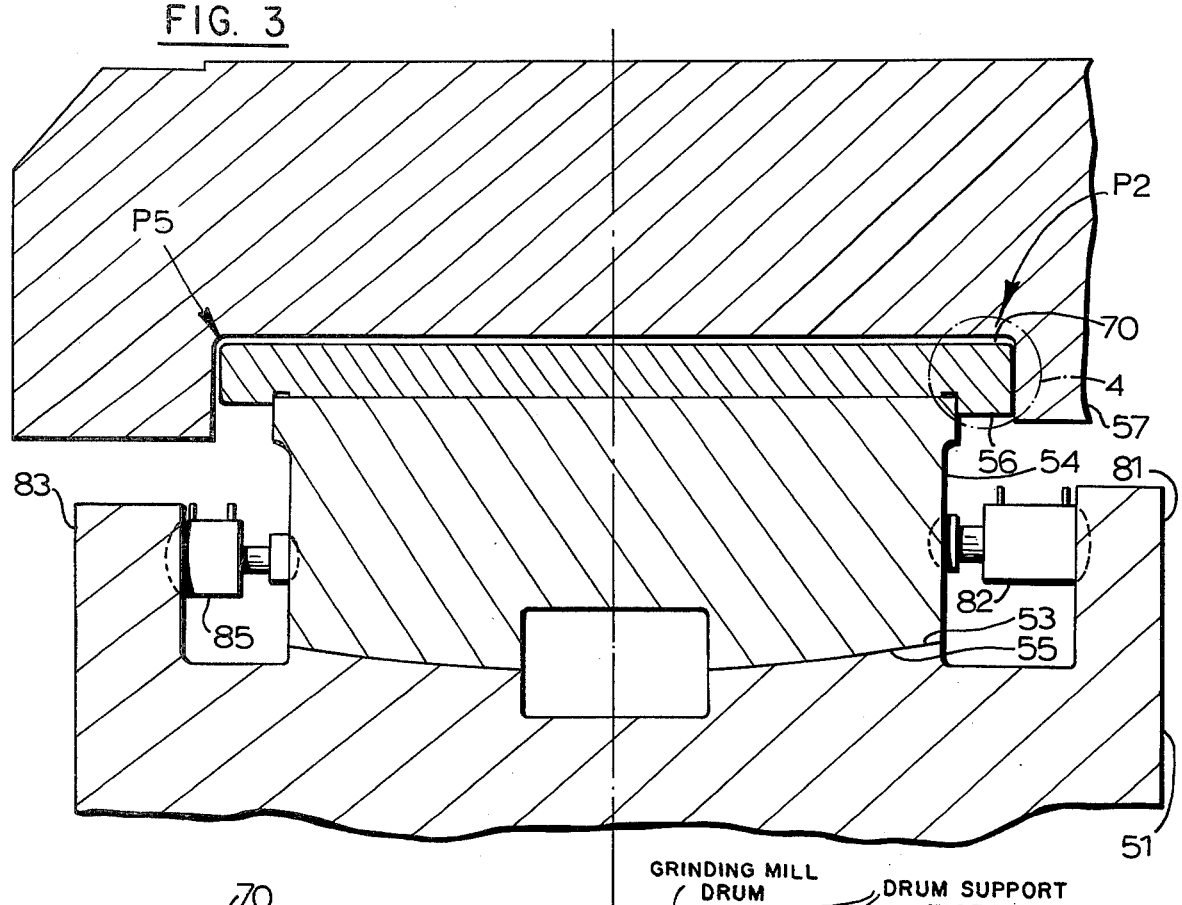
FIG. 3 is an axial section of another embodiment showing a portion of a trunnion and a spherically seated bearing embodying a separate liner.
Figure 4:
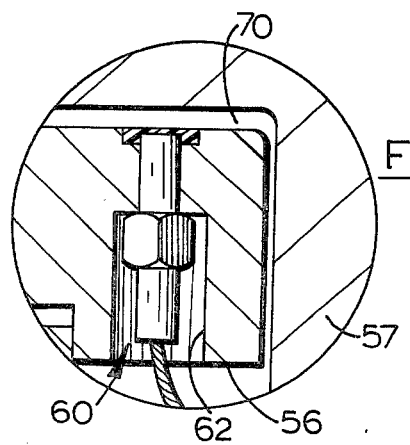
FIG. 4 is an enlarged view of the portion 4 of FIG. 3.

Referring to FIGS. 3 and 4 a portion 51, being part of a support cradle, forms the bearing base, having an axially extending spherically profiled surface 53 on which sits a bearing shell 54, arranged in supporting relation with a bearing liner 56. The shell 54 has a spherical surface 55 to match that of the bearing base surface 53. A portion 57 of the trunnion is shown, the trunnion comprising a hollow support shaft, open at its ends, as is well known in the art.

A pair of semi-annular ribs 81, 83 of the support cradle are axially spaced from the bearing shell 54 and accommodate therebetween three pairs of hydraulic expansible jacks, the pair 82, 85 shown providing the respective forces F2 and F5 shown in FIG. 1 being double-acting. With suitable manipulation the jacks can be used to provide desired combinations of tilting and skewing of the bearing liner 56 in order to promote desired uniformity of bearing support by achieving improved uniformity of oil film thickness, as evidenced by improved uniformity of the readouts from the proximity sensors.

The section for FIG. 3 showing a portion of trunnion 57 carried on bearing liner 56 is located at the lower most or 6-o'clock position, at the centre line of a bearing, and shows the locations P2 and P5 for the related oil film sensors P2, P5 of which one is shown in FIG. 4, and the associated jacks 82, 85.

Referring to FIG. 4, the sensor 60 is located in a recess 62 of the bearing liner 56, the recess being illustrated as a bore separated from the oil film 70 by way of an epoxy or other suitable window, pervious to electro magnetic energy. The sensors 60 herein disclosed are electromagnetic flux generators which achieve flux linkage with the conductive material of trunnion 57.

Figure 5:
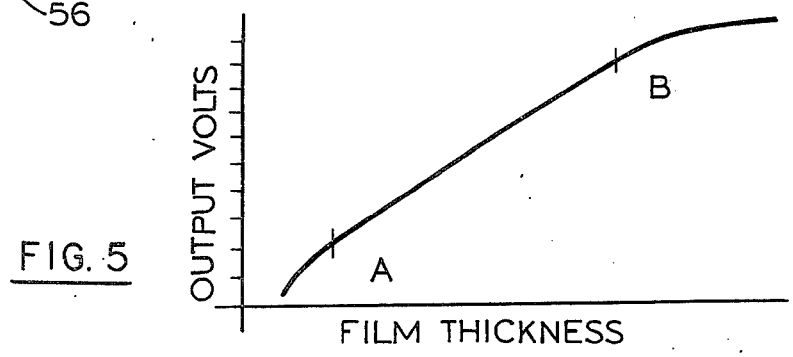
FIG. 5 is a characteristic curve for an electromagnetic gap sensing system.

Referring to FIG. 5, the characteristic output from each of the sensors may be obtained as a D.C. voltage proportional to the film thickness, illustrated as being a substantially straight line relationship, using commercially available commercially available eddy current proximitors which does not form a part of the present invention.

In discussing the utility of the sensors 60, the quality of the oil film 70 as a load bearing medium is satisfactory for the part A-B of the characteristic curve. Operation with film values less than the low value A will lead to bearing failure. Should the clearance normally occupied by the oil film increase significantly to a value above the 'B' value, there is a likelihood that the respective portion of the bearing will not sustain its requisite portion of the load. Thus, while it may appear to be redundant practice, there appears to be virtue in using both the low and the high values of film thickness lying outside the range A-B as an initiating signal for off-loading the bearing.

In view of the relatively slow rate of response to offloading the bearing system by cutting down the mill feed, additional expedients normally would be employed to maintain the integrity of the bearings in such instances, by supplementary lubrication provision.

One load control system shown in FIG. 6, comprises a selector 70 receiving inputs 71, 72, 73 . . . 76 from the respective sensors. The selector is actuated only by sensor input values lying outside predetermined acceptable limits of the characteristic curve of FIG. 5, which serve to actuate the output 80. The output 80 is connected in controlling relation with the controller 84 of the mill feed conveyor motor 86, to vary the rate of feed to the mill input 90. With the capacitor receiving inputs lying within the predetermined acceptable limit values, such as the A-B range for instance, an output to terminals 81 illuminates the tell tale lamp 89, indicating that bearing conditions are within acceptable limits.

The provision of an oscilloscope of other read-out permits a more precise, quantitative determination of the load condition of the bearings to be made, so that loading of the mill can be more precisely increased. It is contemplated that the loading scheme may be made automatic.

Referring to FIG. 7, this shows a typical mill reduction characteristic wherein the power requirement to drive the mill is plotted against the quantity of mill charge. The characteristic curve increases to a maximum, where the power requirement is greatest, and where an optimized milling characteristic exists. An increase in charge quantity beyond this point leads to a reduction in grinding function. Quite evidently it is not possible to operate precisely at the optimum charge value. However, with the enhanced accuracy for determining bearing conditions provided by the present invention it is anticipated that achievement of higher efficiencies may be more reliably obtained.

It should be emphasized that the system is a dynamic system, one of the primary variables being the quality of the run-of-mine or feed being supplied to the mill, which affects the gradient existing through the mill, as is well known in the art.

The control of feed is effected in accordance with the mill charge, which has in the past, in some instances, been predicated upon bearing hydrodynamic pressure as being a function of the charge weight. With the improved monitoring of bearing conditions made possible by the present apparatus, it is contemplated that the mill charge, which is in fact a function of the integral of bearing hydrodynamic pressure, may be more accurately determined and controlled, whereby grinding efficiency may be safely enhanced without imperiling the mill.

Figure 11:
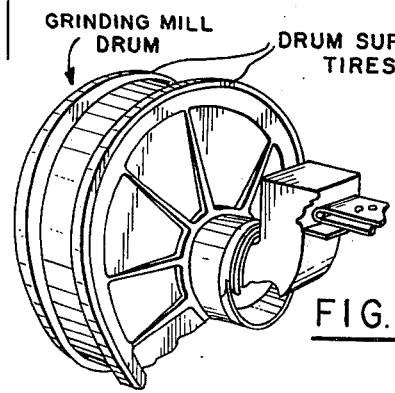

While the major portion of this disclosure is directed to trunnion type support surfaces it will be understood that the recited characteristics also apply in general to drum supports utilizing slipper bearings in supporting relation beneath annular tires attached to the periphery of the drum, in the fashion illustrated in FIG. 11.

So far as the use of the bearing alignment jacks is concerned, readings at proximeters P1, P2 and P3 indicative of unduly small oil film thickness would be interpreted as evidence of tilting of the bearing. Accordingly, by energizing the corresponding jacks at positions F1, F2 (jack 82) and P3 in a sense to extend all three jacks, while permitting the axially opposed jacks at positions F4, F5 (85) and F6 (see FIG. 1) to contract, the bearing is axially displaced on its spherical seat, (in a leftward direction in FIG. 3) and the tilt of the bearing can be corrected.

In fact the primary displacement would be at jack 82 (F5) with the other displacement at the shoulders of the bearing at positions F4, F6 being nominal.

The converse contractive action of the opposing jacks evidently also is required, in order to permit the bearing to move. Where the bearing is skewed e.g. proximeters P1 and P6 show small oil film thicknesses, while promimeters P3 and P4 show large oil film thicknesses indicating that the bearing is skewed clockwise in relation to FIG. 1, then remedial action may be taken by expanding the jacks at positions F1, F6, and correspondingly contracting the jacks at positions F3 and F4, to produce anti-clockwise skew correction. While illustrated as being double acting, in fact single acting actuators could serve for such operation.

It will be evident that the combinations of skew and cant correction can readily bring a bearing into optimized position, with the oil film substantially symetrically positioned to provide continuing operation of the bearing under acceptable conditions.

Figure 8:
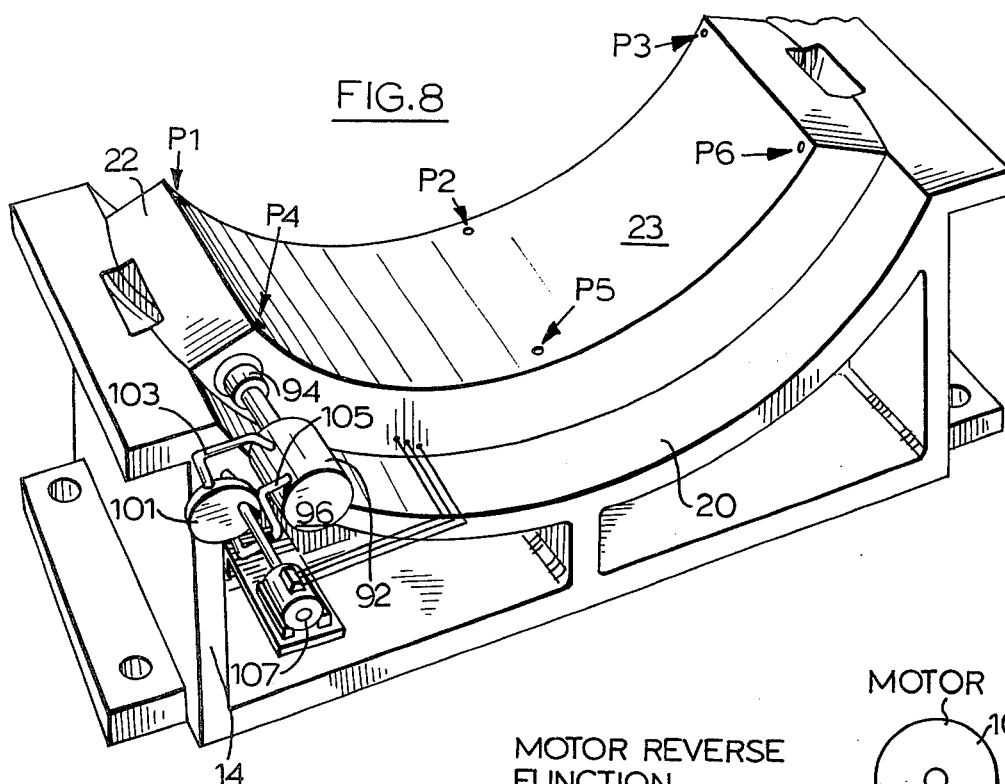
FIG. 8 is a general schematic view showing a portion of bearing adjustment system.
Figure 9:
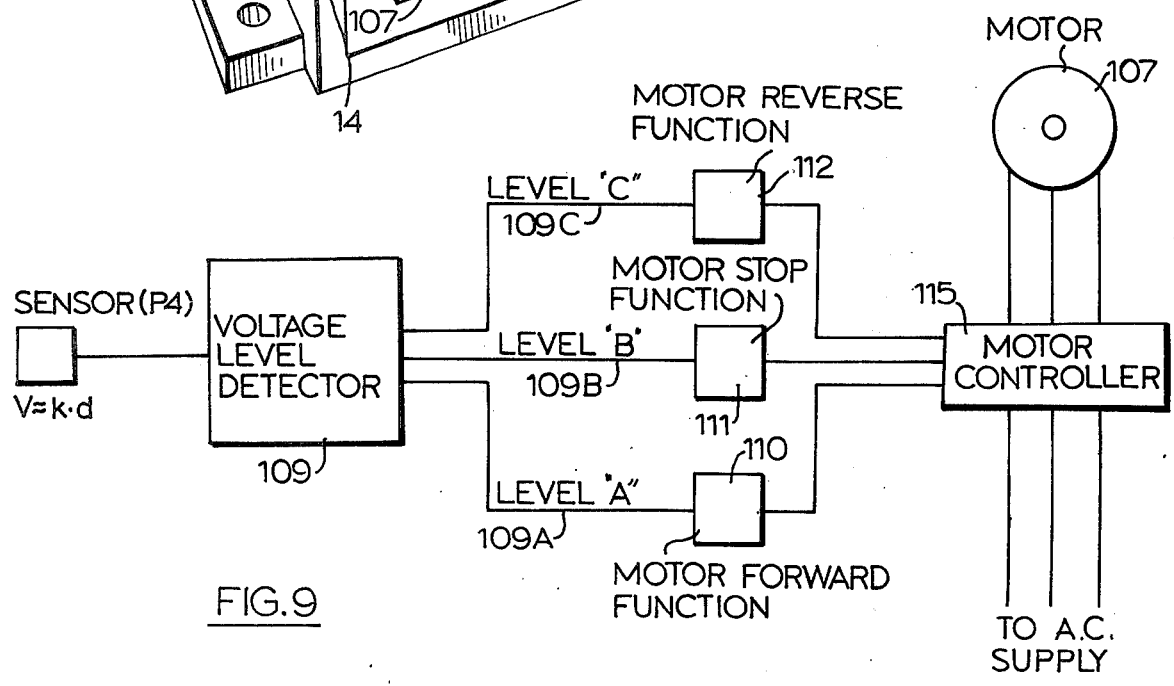
FIG. 9 is a control circuit for providing automatic operation of the bearing adjustment system.

Relating the embodiment illustrated in FIGS. 3, 8 and 9 to an automated system, the positioning forces F1 to F6 (see FIG. 1) acting on shell 22 are provided by a plurality of closed loop servo mechanisms, each comprising a double acting jack 92 having the head end 94 thereof positioned against one side of the shell 22, the other end 96 of the jack being secured by a fixed support (not shown) similar to the rib 81 illustrated in FIG. 3. For each jack the external hydraulic circuit comprising lines 103, 105 are connected to opposite sides of hydraulic pump 101, such that discharge of fluid by the pump 101 through line 103 will shorten the jack 92, while returning fluid to the pump by way of line 105. Reversal of pump 101 causes the jack 92 to extend. The reversible motor 107, illustrated as a 3-phase electric motor, is connected in driving relation with pump 101. As an alternative, a reversible motor driven by air could be readily substituted.

The respective sensors P1–P6, each having a voltage output proportional to the thickness of the oil film of the respective sensor location are each connected with a voltage level detector 109. The voltage level detector 109 has three outputs, 109A, 109B, and 109C, each output conductor being connected with a respective motor function controller. Thus conductor 109A connects with controller 110 for controlling functioning of the respective motor 107 in a forward driving direction; conductor 109B connects with controller 111 for controlling functioning of the motor 107 in a stopping sense; and conductor 109C connects with the controller 112 for controlling functioning of the motor 107 in a reverse direction.

Figure 10:
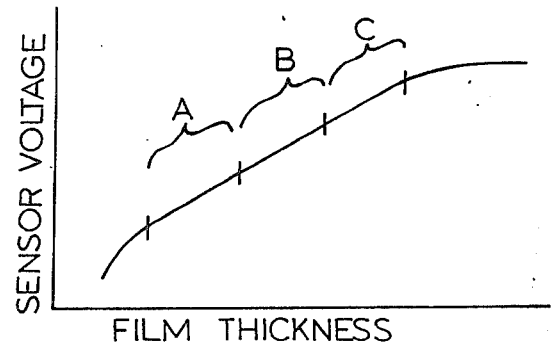
FIG. 10 is the operating characteristic of the automatic control system.

The voltage output from each of the sensors P1 to P6 being proportional to the respective oil film thickness, is detected by the respective voltage level detector 109 as being within the 'A' voltage range, the 'B' voltage range or the 'C' voltage range (see FIG. 10). In addition to detecting the respective range of sensor voltage, the detectors 109 also serve to provide a control signal to the motor function controller 110, 111 or 112.

As an example the sensor P4 and detector 109 function such that when the oil film thickness sensor voltage is in the "A" range the line 109A has a logic 1 (energized) condition and lines 109B and 109C are in a logic zero condition (non-conducting).

In the condition when sensor P4 is in the 'B' range then line 109B is in the logic 1 (or energized) condition and lines 109A and 109C are in the logic zero condition (non-conducting).

Similarly in the "C" range of sensor P4, the line 109C is in the logic 1 energized condition and lines 109A and 109B are in the logic zero condition (non-conducting).

In the event that the bearing pad 22 is level (uncanted) but skewed, i.e. showing for example a small oil film thickness at P4 and at P3, then the sensors P3 and P4 will read in the "A" voltage range and the respective motors 107 will be energized in a forward function. The respective gear pumps 101 will be driven in a direction to expand the respective jack. Thus the jack 92 will expand and push the related corner of bearing pad 22 in a clockwise direction, as will also the similar jacking arrangement at P3 (not shown). Conversely, the sensors P1 and P6 having a high reading indicative of a large oil clearance, will read in the 'C' voltage range, and the respective electric motors will operate in reverse, and back-off the jacks, to permit the bearing pad 22 to skew as desired.

The sensors P2, P5 will probably register consistently in the 'B' range, so that no pumping will take place. However, any slight movements required to accommodate to the skewing of the pad 22 will take place because of bleed-past taking place in the respective gear pumps. Thus, although major movement is prevented except at extremely low rates of change, accommodation to slight movement under the action of the other jacks is possible.

In the case where canting or tilting of the bearing is involved, most if not all of the displacement of bearing pad 22 on its spherical seat will take place as a result of the energization of the sensors P2, P5 controlling the respective jacks in opposed senses, with the four "corner" jacks providing limited stabilization forces unless energized by the respective sensors.

Thus it will be seen that the present arrangement provides a simple automatic arrangement of simple dependable components. Provision of over-pressure switches, not shown, in the respective pump circuits is used to actuate an alarm that the bearing is out of synchromization. Thus if one jack is energized to expand and the opposing jack does not contract, then the over-pressure alarm will be actuated. The motors and pumps are inherently self-protecting.

The present arrangement thus provides a simple, robust automatic bearing adjustment capability.

It will be evident that reduced numbers of actuators can be utilized by positively connecting double-acting jacks to the respective structures to permit pulling as well as pushing loads to be applied to the bearing, to the extent that a single skewing jack and a single canting jack could suffice, if desired.

What I claim as new and desire to secure by Letters Patent of the United States is:

1. A bearing, for use with a large diameter nominally cylindrical deformable support means secured to a rotatable load bearing drum, in partial supporting relation therewith, comprising bearing liner means subtending substantially an arc of a circle, bearing support means in deformable supporting relation beneath the liner means to provide support to an under-surface of the liner means in load transfer relation therewith, a bearing upper surface of said liner means having a substantially part-cylindrical surface to provide support to said cylindrical support means, lubrication supply means to provide a film of fluid lubricant to said liner upper surface, recesses in said liner means in peripherally and axially spaced relation each terminating closely adjacent said cylindrical surface, and sensing probe means located within said recesses having head portions thereof in predetermined oriented and mutually spaced relation from said cylindrical surface to provide in use a read-out responsive to variations in spacing relation between said probes and said cylindrical support means.

2. The bearing as claimed in claim 1, wherein said deformable cylindrical means comprises a trunnion, in attached supporting relation with said rotatable drum.

3. The bearing as claimed in claim 1, wherein said deformable cylindrical means comprises an annular support tire secured to the outer periphery of said rotatable drum.

4. The bearing as claimed in claim 1, in combination with electrical control means for controlling the load conditions of said lubricant film.

5. The bearing as claimed in claim 1, wherein said sensing probe means comprises at least one electromagnetic probe, and means to energize said probe to provide electromagnetic coupling between the probe and said deformable cylindrical means to provide an electrical output responsive to the thickness of said lubricant film interposed between said probe and said cylindrical means.

6. The bearing as claimed in claim 1, wherein said probe means comprises a plurality of sensing heads mounted on said cylindrical means, and arranged in mutually spaced relation to monitor substantially the effective bearing surface of said bearing liner means, to detect variations of thickness of said film lying outside of a predetermined range of values.

7. The bearing as claimed in claim 6 wherein said sensing heads are electromagnetic, including means to energize said heads in flux-linking relation with said deformable cylindrical means, and control means connected therewith to control operating conditon of said film within predetermined limits.

8. The combination as claimed in claim 7, wherein said control means includes drum loading means to control the rate of feed to the drum.

9. The bearing as claimed in claim 7 in combination with at least one other like bearing arranged in supporting relation with said drum.

10. The bearing as claimed in claim 7 wherein said control means includes bearing alignment means having at least one alignment device to permit controlled skewing of said bearing relative to the main axis of said cylindrical support means.

11. The bearing as claimed in claim 7 wherein said control means includes bearing alignment means having at least one alignment device to permit controlled canting of said bearing relative to the main axis of said cylindrical support means.

* * * * *